No. 666,116. Patented Jan. 15, 1901.
E. F. SYLVIS.
BIRD TRAP.
(Application filed Sept. 20, 1900.)
(No Model.) 2 Sheets—Sheet 2.
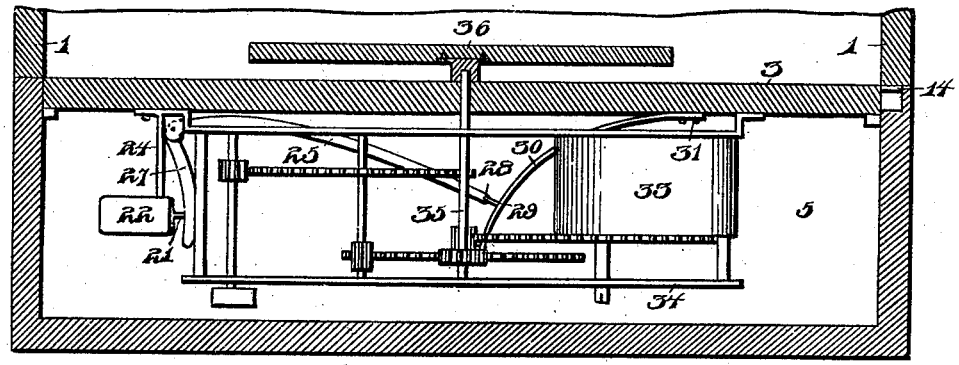
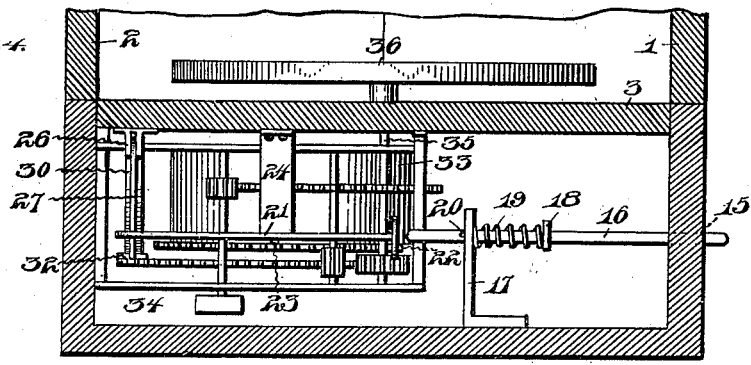
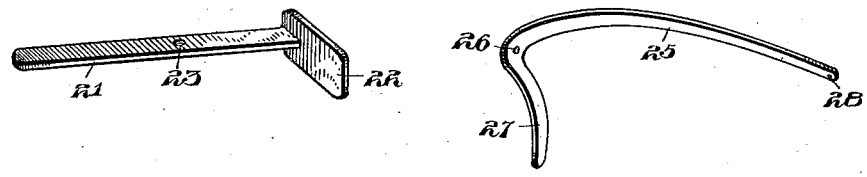
Witnesses:
Inventor.
E. F. Sylvis.

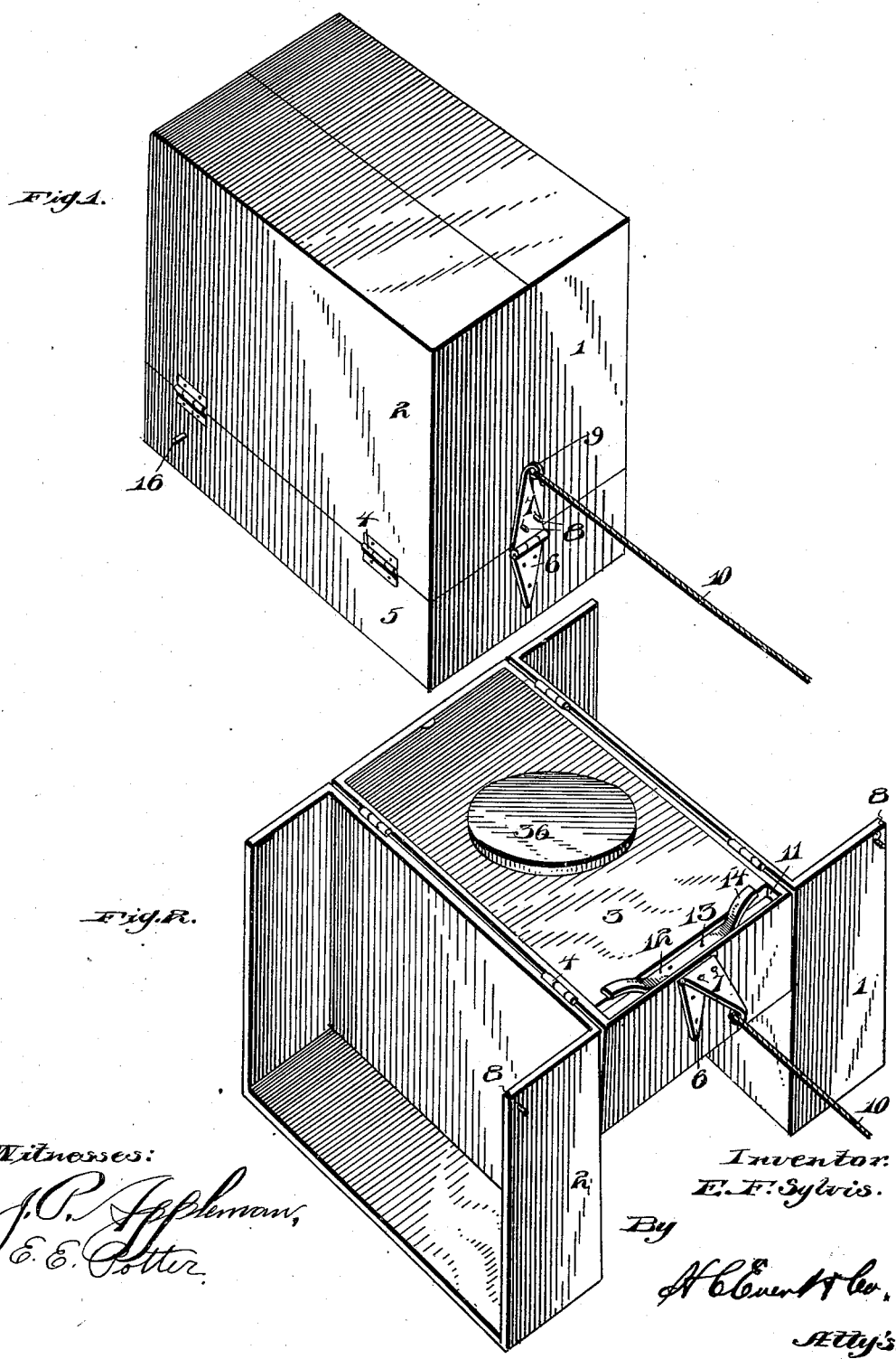

UNITED STATES PATENT OFFICE.

EDWIN F. SYLVIS, OF INDIANA, PENNSYLVANIA.

BIRD-TRAP.

SPECIFICATION forming part of Letters Patent No. 666,116, dated January 15, 1901.

Application filed September 20, 1900. Serial No. 30,546. (No model.)

*To all whom it may concern:*

Be it known that I, EDWIN F. SYLVIS, a citizen of the United States of America, residing at Indiana, in the county of Indiana and State of Pennsylvania, have invented certain new and useful Improvements in Bird-Traps, of which the following is a specification, reference being had therein to the accompanying drawings.

This invention relates to certain new and useful improvements in bird-traps, and more particularly to traps that are used when shooting live birds or pigeons.

The invention has for its object the provision of novel means whereby when the trap is sprung it will release the bird from the inclosure and simultaneously with the opening and springing of the trap a turn-table will be automatically set in motion, which will tend to cause the bird to immediately fly away.

It frequently occurs when shooting live birds that after the trap is sprung the bird will not fly or will not fly away for some time. It is the aim of this invention to provide such means as will tend to frighten the bird when the trap is sprung and will cause it to fly.

With the above and other objects in view the invention consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1 is a perspective view of my improved bird-trap, showing the same closed. Fig. 2 is a similar view showing the trap open. Fig. 3 is a longitudinal vertical sectional view of the double bottom of the trap, illustrating more particularly the mechanism operating the turn-table. Fig. 4 is a transverse vertical sectional view of the same. Fig. 5 is a perspective view of the trip-lever. Fig. 6 is a perspective view of the trip-arm.

In the drawings, the reference-numerals 1 and 2 represent the sections of the casing, which are secured to the false bottom 3 by means of hinges 4.

The reference-numeral 5 represents the lower casing, the false bottom 3 forming the top of the said lower casing. This casing is provided with a hinge 6, the upper section of said hinge having formed therein apertures 7 to receive pins 8, which are arranged upon the front of the sections 1 and 2 and serve as fastening means to secure the said sections together. The upper end of the hinge 6 is further provided with an eye 9, adapted to receive the end of the operating-cord 10. The false bottom 3 is slightly cut away, as shown at 11, to receive a retractile spring 12, having a flat portion which is secured, as at 13, to the side of the lower casing 5. This spring 12 has upwardly-extending free ends 14, which normally extend above the lower casing 5; but when the sections of the upper casing are closed the ends 14 of the spring will be flush with the lower casing. The side of the lower casing 5 is apertured, as at 15, to receive a spring-pressed rod 16, the latter extending when in normal position a distance through the casing, said rod extending horizontally through the bar 17, which is rigidly secured to the bottom of the lower casing. Said rod 16 is further provided with a nut or collar 18, and a spiral spring 19 encircles the shaft 16 between the bearing 17 and the collar 18. A pin is arranged upon the shaft 16 upon the opposite side of the bearing 17, the latter being adapted to limit the movement of the ratchet.

The reference-numeral 21 represents a trip-lever having a head 22, against which the end of the rod 16 operates, said trip-lever being pivotally secured at 23 to the bracket 24, arranged upon the under side of the false bottom 3.

A trip-arm 25 is pivotally secured, as at 26, to the false bottom 3, and the free end 27 of said arm extends downwardly to receive said trip-lever 21, which operates against said portion, the opposite end of said lever having formed therein an eye 28 to receive a link 29, connected to the retractile spring 30. The upper end of said spring 30 is rigidly secured to the under side of the false bottom 3, as shown at 31, and the free end of the same extends downwardly to engage projections 32, arranged upon one of the wheels of the clock mechanism 33, said clock mechanism being held in position and mounted in a frame 34, securely fastened to the under face of the false bottom. From one of the wheels of the clock mechanism extends upwardly a shaft 35 through the false bottom 3, said shaft having mounted thereon a turn-table 36.

The operation of my improved bird-trap is as follows: We will assume, for the purpose of describing the operation of the device, that the clock mechanism is wound up and the trap closed, having caged therein a bird. In order to spring the trap, the operating-cord is pulled, thereby closing the hinge, releasing the same from engagement with the pin, and the springs will then tend to throw the sections 1 and 2 in the position as shown in Fig. 2 of the drawings. The sides of the section 2 coming into contact with the rod 16 will tend to force the same inwardly against the trip-lever, which in turn operates the trip-arm, thereby releasing the spring from engagement with the projections arranged on the wheel of the clock mechanism. The clock mechanism is thus released, and the mainspring of the clock will operate the wheel and in turn rotate the upwardly-extending shaft, which communicates a rotary movement to the turn-table. The bird will then take flight, and the operation is completed. It will be readily seen that this operation may be easily repeated any number of times.

Particular attention is called to the fact that various changes may be made in the details of construction without departing from the general spirit of my invention.

Having thus fully described my invention, what I claim as new, and desire to secure by Letters Patent, is—

1. In a bird-trap, the combination of a casing formed in two sections, a lower casing hinged thereto, clock mechanism arranged in said lower casing, a false bottom arranged between said lower casing and said upper section of the casing, and a turn-table secured upon said false bottom and operated by said clock mechanism, substantially as described.

2. In a bird-trap, the combination of an upper casing formed in two sections, a lower casing hinged to said sections, means to retain said upper sections together, releasing means to automatically open said upper sections, clock mechanism arranged in said lower section, a turn-table connected to said clock mechanism, and means whereby said clock mechanism is set in motion when the said upper sections are opened, all parts being arranged and operating substantially as herein shown and described.

In testimony whereof I affix my signature in the presence of two witnesses.

EDWIN F. SYLVIS.

Witnesses:
JOHN NOLAND,
H. C. EVERT.